(12) United States Patent
Saito et al.

(10) Patent No.: US 6,839,100 B1
(45) Date of Patent: ***Jan. 4, 2005

(54) LIQUID CRYSTAL DISPLAY DEVICE

(75) Inventors: Ken Saito, Mobara (JP); Haruhisa Ootsuka, Mobara (JP)

(73) Assignee: Hitachi, Ltd., Tokyo (JP)

( * ) Notice: Subject to any disclaimer, the term of this patent is extended or adjusted under 35 U.S.C. 154(b) by 484 days.

This patent is subject to a terminal disclaimer.

(21) Appl. No.: 09/698,231

(22) Filed: Oct. 30, 2000

Related U.S. Application Data (63) Continuation of application No. 09/488,546, filed on Jan. 21, 2000, now Pat. No. 6,441,874.

(30) Foreign Application Priority Data

Jan. 26, 1999 (JP) .......................................... 11-017409

(51) Int. Cl.$^7$ ...................... G02F 1/1333; G02F 1/1335
(52) U.S. Cl. .......................................... 349/58; 349/65
(58) Field of Search .............................. 349/58, 61–63, 349/65

(56) References Cited

U.S. PATENT DOCUMENTS

| | | | |
|---|---|---|---|
| 5,146,354 A | | 9/1992 | Plesinger |
| 5,299,038 A | | 3/1994 | Hamada et al. |
| 5,504,605 A | | 4/1996 | Sakuma et al. |
| 5,546,203 A | * | 8/1996 | Takao ........................... 349/62 |
| 5,726,722 A | * | 3/1998 | Uehara et al. ................ 349/66 |
| 5,742,366 A | | 4/1998 | Imoto |
| 5,815,227 A | | 9/1998 | Lee |

FOREIGN PATENT DOCUMENTS

| JP | 60-151947 | 1/1994 |
|---|---|---|
| JP | 8-334760 | 6/1995 |

OTHER PUBLICATIONS

Shin–Etsu's Catalog (translation), "Thermal Conductivity," p. 5.
Shin–Etsu '87.6/'94.9.3 I.E. printed in Japan, "Shin–Etsu's Catalog", Thermal Conductivity (with English translation).

* cited by examiner

*Primary Examiner*—Toan Ton
(74) *Attorney, Agent, or Firm*—Reed Smith LLP; Stanley P. Fisher, Esq.; Juan Carlos A. Marquez, Esq.

(57) ABSTRACT

For preventing a luminance drop of a liquid crystal display panel comprising a liquid crystal display panel, a driver circuit of driving the liquid crystal panel, and a luminance having a fluorescent lamp as one of elements thereof, the present invention provides a heat retaining means for an electrode portion of the fluorescent lamp, and suppresses heat radiation at the electrode portion of the fluorescent lamp so as to secure sufficient amount of mercuric vapor in the whole of the fluorescent lamp.

12 Claims, 9 Drawing Sheets

FIG. 13B ically, to liquid crystal display
LIQUID CRYSTAL DISPLAY DEVICE This application is a continuation application based on the pending application Ser. No. 09/488,546 filed on Jan. 21, 2000 now U.S. Pat. No. 6,441,874.

BACKGROUND OF THE INVENTION

1. Field of the Invention

The present invention relates to liquid crystal display devices and, more particularly, to liquid crystal display devices having a suitable structure for displaying images with high luminance in a whole screen thereof by reducing temperature dispersion an illuminating light source thereof and preferably by evening temperature distribution of the illuminating light source.

2. Description of the Related Art

In a liquid crystal display device being utilized as displaying means for a personal computers or a monitor for the other purposes (e.g. a video monitor), an image being generated in a liquid crystal display panel is visualized by irradiating the liquid crystal display panel with illuminating light and by emitting the illuminating light being transmitted or reflected by the liquid crystal display panel from a display side thereof.

The liquid crystal display device of this sort utilizes a liquid crystal display panel comprising a pair of substrates being stuck on one another with a certain space therebetween and having pixel-selector electrodes being formed thereon, and a liquid crystal layer being interposed in the certain space. At one surface or both surfaces of the liquid crystal display panel either a polarizer plate (or, film) is formed thereon, or an optical retardation plate (or, film) and a polarizer plate (or, film) are stacked thereon. In the thus constructed liquid crystal display panel, an image is generated by modulating orientation states of liquid crystal molecules of the liquid crystal layer at selected pixel portions. As the image being generated in the liquid crystal display panel is still invisible itself, therefore the liquid crystal display device having the liquid crystal display panel is constructed to irradiate the liquid crystal display panel with extraneous light thereto, and to make the liquid crystal display panel transmit or reflect the incident light thereto, so as to visualize the generated image at a screen of the liquid crystal display device.

There are two kinds of light sources of the aforementioned illuminating light: one is "Transparent mode (Transparent type)" using a light source being disposed at a back side (opposite to the display side) of the liquid crystal display panel, i.e. backlight, and another is "Reflective mode (Reflective type)" utilizing extraneous light entering the viewing side (also called, the display side).

The backlight type which has an illuminating light source (an illumination system, a luminaire) being disposed at the back side of the liquid crystal display panel comes into wide use for the liquid crystal display device being provided for a notebook-sized personal computer and a display monitor (display screen). On the other hand, since a power source being mounted in a device, for example, PDA (Personal Digital Assistants: miniaturized portable data terminals) has a small capacity for itself, the liquid crystal display device coming into use for the such device does not have an active illuminating light source like the backlight, but utilizes ambient light being incident thereupon as illuminating light thereof. However, for enabling use of the liquid crystal display device of this sort in a faintly lit environment or an absolutely extraneous light-free environment, some products thereof having a auxiliary light source thereto appear on the market.

Most of the liquid crystal display devices utilizing the extraneous light belong to the reflective type. The reflective-type liquid crystal display device comprises a reflector layer on an inner surface of a substrate (lower substrate) thereof being opposite to another substrate (upper substrate) thereof being disposed at the display side (the viewing side) thereof. The reflector layer is formed by forming a layer of metal or the like on the lower substrate, and then applying a surface-treatment thereto for making a surface thereof mirror-like or specular. The extraneous light comes into the reflective-type liquid crystal display device through the upper substrate at the viewing side thereof, and then is reflected by the reflector layer thereof. The reflective-type liquid crystal display device visualizes an image being generated thereby by emitting the thus reflected light through the upper substrate thereof. Furthermore, another kind of the reflective-type liquid crystal display device which has a lower substrate thereof being formed of a transparent material and a specular reflector being provided at a backside thereof (or, a rear side thereof: behind the lower substrate from a viewing side thereof) is known as well.

If the auxiliary light source is employed for the reflective-type liquid crystal display device, the illuminating light source thereof is usually assembled by stacking a light guide member on a liquid crystal display panel thereof and disposing a linear lamp (e.g. a cylindrical light source) at one of edges of the light guide member so as to propagate light emitted from the linear lamp in the light guide member.

Moreover, in some instances of the reflective-type liquid crystal display device being employed for the PDA or the like, so-called touch panel for inputting data or the like onto a display surface thereof with a pen or a finger is provided therefor. The touch panel of this sort may be stacked on an upper surface of the liquid crystal display panel, or may be stacked on the light guide member composing the auxiliary light source when the auxiliary light source is equipped for the liquid crystal display panel.

Figure 11:
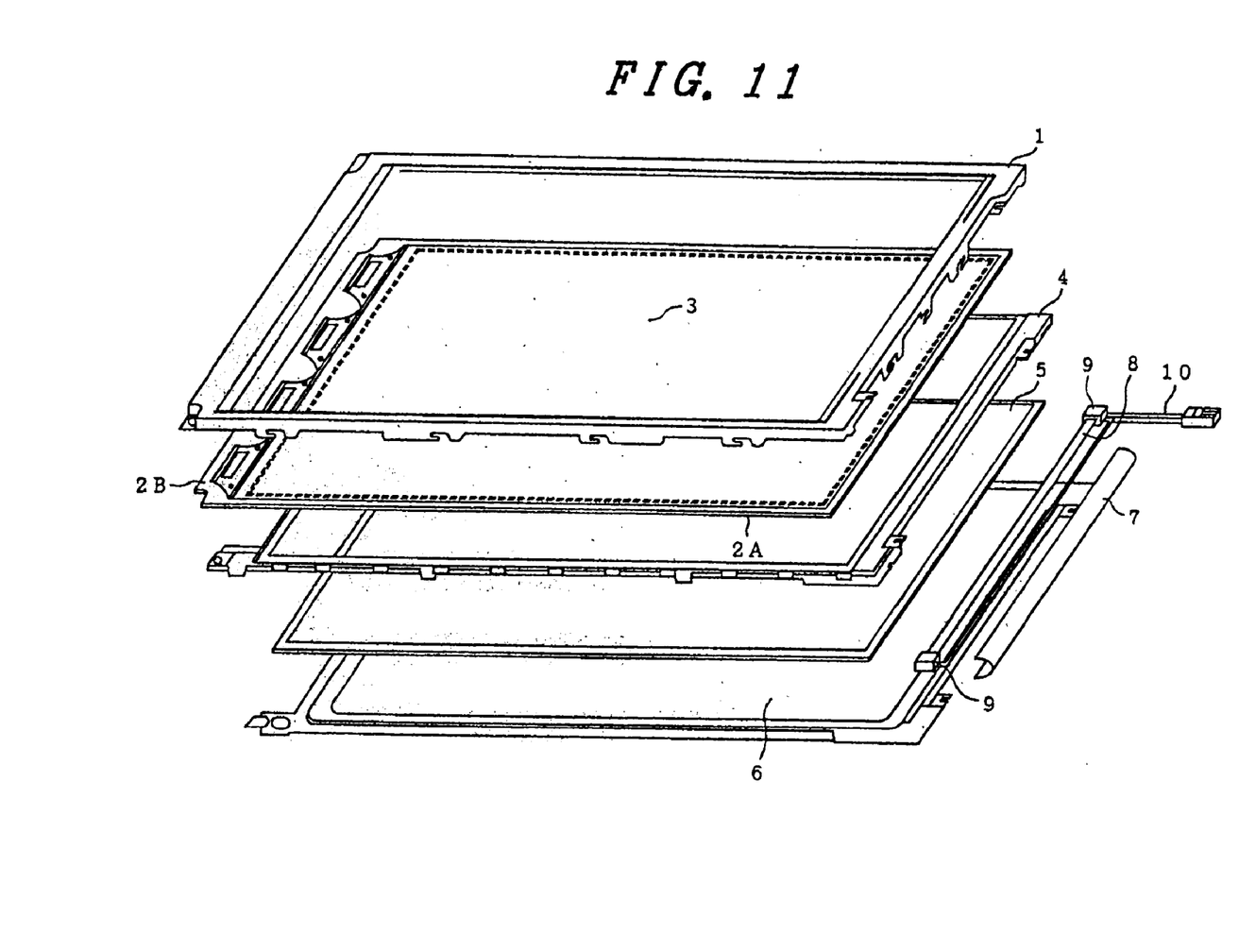
FIG. 11 is an disassembled squint view of one of conventional liquid crystal display devices for explaining a structure thereof.

FIG. 11 shows an disassembled squint view (an exploded view) for explaining one of exemplary configurations of the conventional transparent-type liquid crystal display device. The backlight is constitute with a light guide plate 5 and a fluorescent lamp 8 being disposed at a side-edge of the light guide plate and both ends of the fluorescent lamp are equipped with rubber bushes (lamp holders) 9 also being provided for holding electric power supplying leads 10. The liquid crystal display panel 3 and the light guide plate 5 are incorporated into an intermediate mold case 4, and the fluorescent lamp 8 is disposed at a light source housing 4A being formed within the intermediate mold case 4.

The driving circuit boards 2A, 2B are installed at the peripheries of the liquid crystal display device 3. A lamp reflector sheet 7 is installed along a circumference of the fluorescent lamp 8, and then both the lamp reflector sheet 7 and the fluorescent lamp 8 are fixed between a lower frame of metal 6 and an upper frame 1 by sandwiching them together with the liquid crystal display panel 3 between these frames. Needless to say, the upper frame 1 has a window for exposing the screen of the liquid crystal display panel 3.

An cold cathode fluorescent lamp is often used as the fluorescent lamp 8. The cold cathode fluorescent lamp comprises a glass tube of several millimeters in an inside diameter thereof which has a fluorescent film (layer) being coated on an inner surface thereof and contains mixed gas of Ne (neon) and Ar (argon) or the like and Hg (mercury) being sealed therein, and a pair of electrodes installed at ends thereof being opposite to one another.

When high voltage of several hundred volts (V) is applied between the pair of electrodes of the fluorescent lamp 8, electric discharge between both of the electrodes heats an inside thereof and generates mercuric vapor therein, and ultraviolet (UV) light being generated by excitation of the mercuric vapor stimulates the fluorescent film so that the fluorescent film emits visible light. Therefore, as the inside of the fluorescent lamp is heated higher by increasing currents applied thereto, a higher luminance is obtained thereby.

It is known that an electrooptical characteristic of the liquid crystal display panel 3 varies largely with ambient temperature thereof. Although the cold cathode fluorescent lamp is employed as the fluorescent lamp 8, heat quantity being generated at an electrode thereof is still so large that a temperature around the electrode rises up to 80° C. or higher when the current flowing thereto is 4 milliamperes (mA) in its effective value. Leaving the heat appearing around the electrode as it is, the heat is transmitted to the liquid crystal display panel 3, and deteriorates an image quality thereof by bleaching a part of a screen thereof.

For preventing such a deterioration of the image, the holder 9 shown in FIG. 11 is formed of silicone resin materials which has sufficient thermal conductivity and insulates impressed voltage of c.a. 1000 V being applied to the electrode of the cold cathode fluorescent lamp when it is turned on.

The lower frame 6 is made of aluminum (Al) for diffusing the heat throughout the display surface of the liquid crystal display panel 3 by its good thermal conductivity and for reducing gross weight thereof.

As mentioned above, each of the conventional lamp holder 9 and the conventional lower frame 6 has a function and a structure for dispersing the heat being emitted from the cold cathode fluorescent lamp.

Recently, a double-piped cold cathode fluorescent lamp has been proposed as a suitable way for suppressing the heat generated therefrom and moreover for obtaining high luminance thereof. The double-piped cold cathode fluorescent lamp is equipped with an additional transparent glass tube, covering a circumference of the conventional cold cathode fluorescent lamp and seals any appropriate decompressed gas in a space between the cold cathode fluorescent lamp and the additional glass tube, so as to keep the temperature of the cold cathode fluorescent lamp properly to obtain sufficient luminance thereof even if a current supplied thereto is relatively low. (see, Japanese Patent Application Laid-Open No. Hei 08-334760/JP-A-334760/1996)

By employing the cold cathode fluorescent lamp of the aforementioned double-piped structure as a light source of the liquid crystal display device, the liquid crystal display device with low power consumption becomes available.

Because miniaturized and lightweight portable data terminal devices are battery-powered, the liquid crystal display device (devices called PDA, or the like) being employed therefor is required especially to save power consumption. The portion of the liquid crystal display device which consumes electric power most is a luminaire section having a backlight (or, a front light) or the like. Therefore, the fluorescent lamp of the liquid crystal display device need to be operated by less tube currents as possible for saving power consumption thereof.

Figure 12:
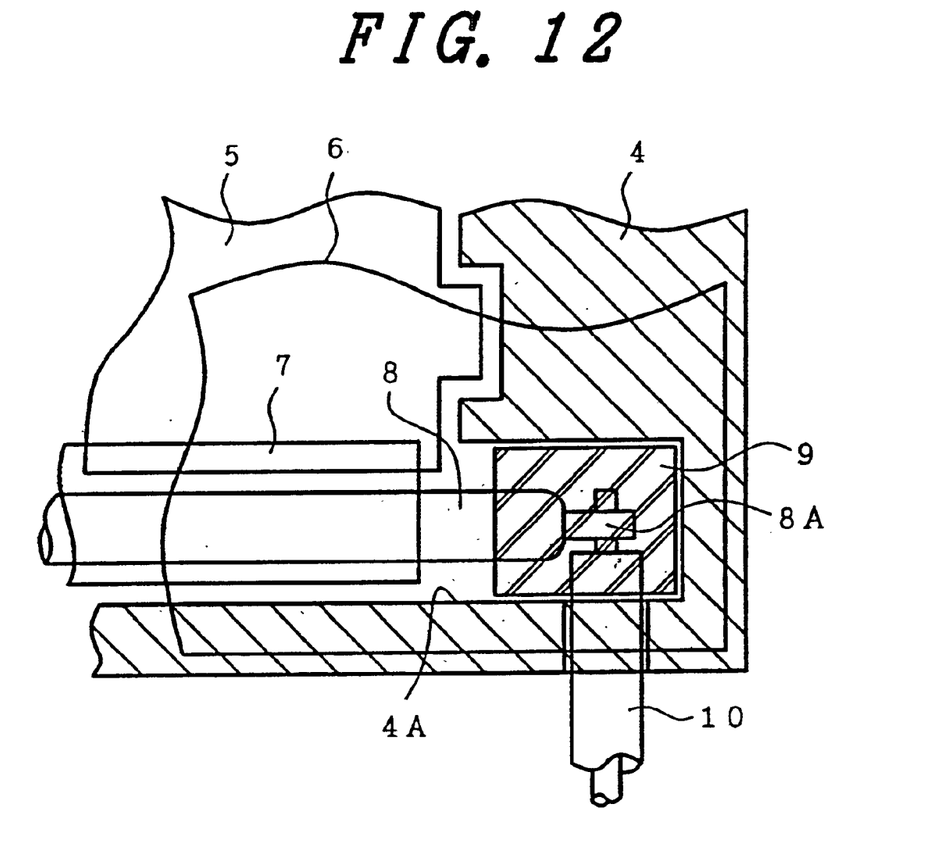
FIG. 12 is a partial plan view of the liquid crystal display device shown in FIG. 11 for explaining a layout of a structure around a backlight thereof.

FIG. 12 shows a sectionally enlarged view for explaining a layout of structural elements in the backlight portion of the liquid crystal display device shown in FIG. 11. Each of the structural elements is drawn by solid lines for convenience.

In FIG. 12, by putting the lamp holder 9 installed at an end of the fluorescent lamp 8 in a fluorescent lamp retaining portion 4A provided by the intermediate mold frame 4, the fluorescent lamp 8 is retained at the certain position, i.e. the position in the vicinity of a side edge of the light guide plate 5. More specifically, an electric power supply lead (connector cable) 10 is connected to an electrode terminal 8A of the fluorescent lamp 8 by solder or the like, and the holder 9 serves as both a protector and an insulator for the connecting portion of the electric power supply lead 10 and the electrode terminal 8A.

The lamp reflector sheet 7 is provided around the fluorescent lamp 8 and the light guide plate 5 other than an area between the fluorescent lamp 8 and the light guide plate 5. Each edge of the lamp reflector sheet 7 in a longitudinal direction thereof is fixed on both the front and the back of the light guide plate 5 by fixing means suitable therefor, so that light emitted from the fluorescent lamp 8 is reflected effectively towards the light guide plate 5.

The lower frame 6 is disposed under the intermediate mold frame 4 having the fluorescent lamp retaining portion 4A. The lower frame 6 is formed of light metal, preferably of Aluminum, and functions to radiate heat from the fluorescent lamp.

SUMMARY OF THE INVENTION

In the conventional technologies, the lamp holder 9 is contacted with the lower frame 6, and disperse heat of the fluorescent lamp 8 from the lamp holder 9 to the lower frame 6 so that temperature of the lamp bolder 9, i.e. end portions of the fluorescent lamp 8 decreases.

The mercuric vapor tends to gather at a portion of the fluorescent lamp 8 temperature of which has dropped, and is turned into the mercuric droplets by being cooled thereat. As most of the mercuric vapor gathers and then is condensed at the end portion of the fluorescent lamp 8 (the portion inside temperature of which is relatively low) during long time lighting thereof, the production amount of the mercuric vapor in a whole of the fluorescent lamp 8 decreases. Consequently, a problem of a luminance drop in the fluorescent lamp 8 arises.

One of the objects of the present invention is to provide a liquid crystal display device which keeps so sufficient mercuric vapor in a whole area thereof by restricting a thermal radiation from an end portion thereof as to prevent the luminance drop thereof.

For achieving the aforementioned object, the fluorescent lamp according to the present invention is characterized in that a heat retaining means is provided for an end portion, i.e. an electrode portion of the fluorescent lamp. Some representatives structures of the present inventions as disclosed herein will be enumerated as follows.

(1) A liquid crystal display device comprising a liquid crystal display panel, a driver circuit, for driving the liquid crystal display panel and a luminaire having a fluorescent as one of elements of the luminaire, wherein a heat retaining means is provided for a electrode portion of the fluorescent lamp.

(2) A liquid crystal display device having a liquid crystal display panel, a driver circuit for driving the liquid crystal display panel, and a luminaire having a fluorescent lamp as one of elements thereof and irradiating a rear side of the liquid crystal display panel (an opposite side of a viewing side of the liquid crystal display panel) with illuminating light thereby, wherein a beat retaining means is provided for a electrode portion of the fluorescent lamp.

(3) A liquid crystal display device having a liquid crystal display panel, a driver circuits for driving the liquid crystal display panel, and a luminaire having a fluorescent lamp as one of elements thereof and irradiating a front side of the liquid crystal display panel (a viewing side of the liquid crystal display panel) with illuminating light thereby, wherein a heat retaining means is provided for a electrode portion of the fluorescent lamp.

(4) A liquid crystal display device defined as (2) or (3), wherein a touch panel is stacked on an outermost surface of the liquid crystal display panel.

Specifically, the heat retaining means is preferably formed of foamed resin belonging to urethane series, and other heat-resulting organic or inorganic material having sufficient flexibility like formed rubber belonging to silicone resin is available thereto, also.

The present invention should not be limited to the aforementioned structures, and enables to provide many kinds of variations within a technical concept thereof.

These and other objects, features and advantages of the present invention will become more apparent from the following description when taken in conjunction with the accompanying drawings.

BRIEF DESCRIPTION OF THE DRAWINGS

FIGS. 14A through 14C are cross-sectional views of fluorescent lamps having double-piped structures.

DETAILED DESCRIPTION

Preferred embodiments of the present invention be explained with reference to the accompanying drawings as follows.

Embodiment 1

Figure 1:
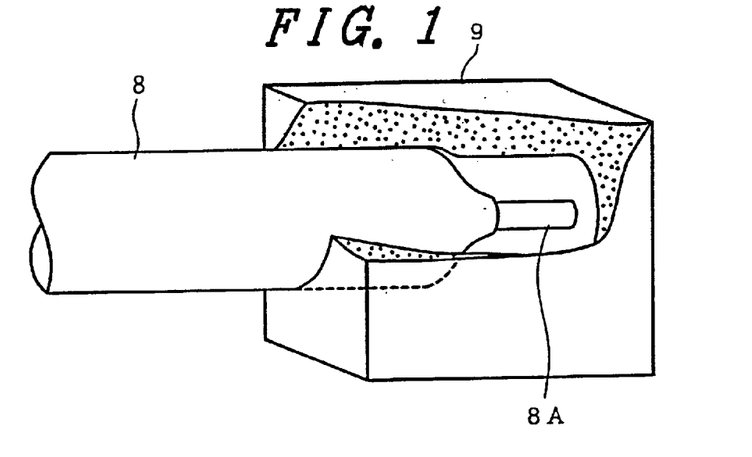
FIG. 1 is an enlarged view of a main portion for explaining a liquid crystal display device according to a first embodiment of the present invention.

FIG. 1 is an enlarged view of a main portion in a luminaire (or, a lighting unit) for explaining a liquid crystal display device according to a first embodiment of the present invention, and shows a structure of an electrode portion of a fluorescent lamp as a linear light source (or, a tubular light source) constituting the luminaire.

In this embodiment, a cold cathode fluorescent lamp is utilized for the fluorescent lamp 8, and the electrode portions at both ends thereof are inserted elastically into lamp holders 9 respectively. These lamp holders 9 are flexible, has an almost rectangular exterior, and has an opening for inserting an end of the fluorescent lamp 8 into a cavity formed therein on one of surfaces thereof. This cavity has a dead end in the lamp holder 9, but may have a tunnel-like shape which pierces through the lamp holder 9 to another surface thereof opposite to the surface having the opening.

An electrode terminal 8A is pulled out from the electrode portion of the fluorescent lamp 8, and an electric power supplying lead being connected to a power source section of the liquid crystal display device (not shown) is soldered to the electrode terminal for example in a similar matter to FIG. 12, but is omitted in this drawing.

According to this embodiment, heat in the electrode portion of the fluorescent lamp 8 is retained by setting the fluorescent lamp equipped with the lamp holder 9 in an intermediate mold frame as shown in FIG. 11 so that a temperature drop of the electrode portion is suppressed. Consequently, the liquid crystal display device of this embodiment enables to display an image thereby without luminescence decrease.

Embodiment 2

Figure 2:
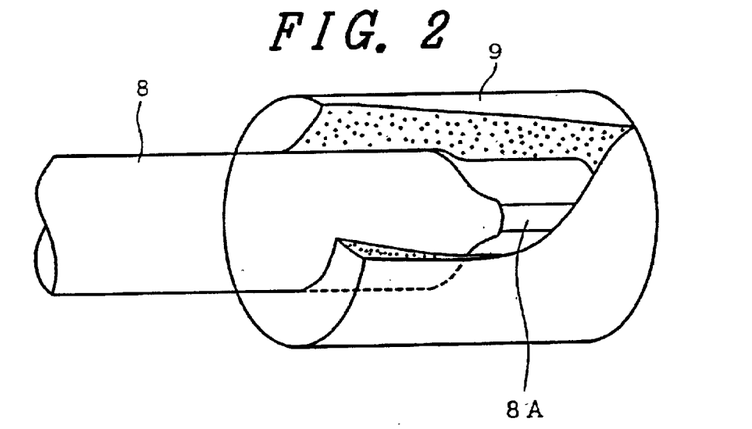
FIG. 2 is an enlarged view of a main portion in a luminaire for explaining a liquid crystal display device according to a second embodiment of the present invention.

FIG. 2 is an enlarged view of a main portion in a luminaire for explaining a liquid crystal display device according to a second embodiment of the present invention, and shows a structure of an electrode portion of a fluorescent lamp as a linear light source constituting the luminaire.

A difference in this embodiment from the aforementioned first embodiment is that the lamp holder has an almost cylindrical exterior, and has an opening for inserting an end of the fluorescent lamp 8 into a cavity formed therein on one of end surfaces thereof. This cavity has a dead end in the lamp holder 9, but may have a tunnel-like shape which pierces through the lamp holder 9 to another side thereof opposite to the surface having the opening.

According to this embodiment also, heat in the electrode portion of the fluorescent lamp 8 is retained by setting the fluorescent lamp equipped with the lamp holder 9 in an intermediate old frame as shown in FIG. 11 so that a temperature drop of the electrode portion is suppressed. Consequently, the liquid crystal display device of this embodiment enables to display an image thereby without luminance decrease.

Embodiment 3

Figure 3:
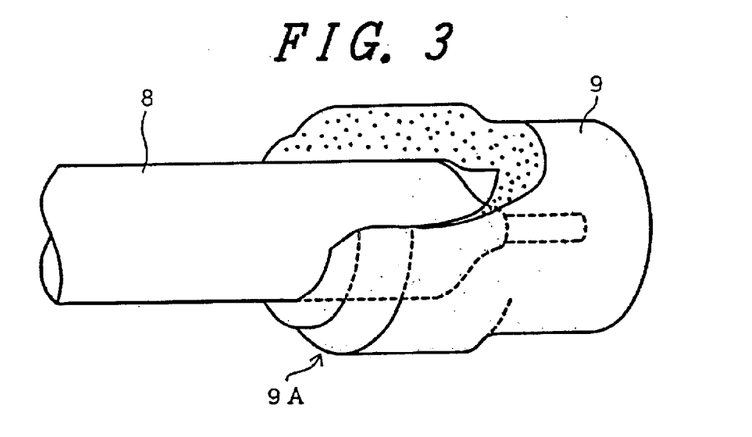
FIG. 3 is an enlarged view of a main portion in a luminaire for explaining a liquid crystal display device according to a third embodiment of the present invention.

In FIG. 3 is an enlarged views of a main portion in a luminaire for explaining a liquid crystal display device according to a third embodiment of the present invention, and shows a structure of an electrode portion of a fluorescent lamp as a linear light source constituting the luminaire.

In this embodiment, the lamp holder 9 is shaped into an almost cylindrical exterior like that of the second embodiment, and has an opening for inserting an end (an electrode portion) of the fluorescent lamp 8 into a cavity formed therein on one of end surfaces thereof also. An external diameter of a circumference 9A around this opening is varied along a longitudinal direction of the fluorescent lamp 8 so as to adhere to outer wall of the fluorescent lamp. This cavity in this embodiment has a dead end in the lamp holder 9 also, but may have a tunnel-like shape which pierces through the lamp holder 9 to another side thereof opposite to the surface having the opening.

According to this embodiment also, heat in the electrode portion of the fluorescent lamp 8 is retained by setting the fluorescent lamp equipped with the lamp holder 9 in an intermediate mold frame as shown in FIG. 11 so that a temperature drop of the electrode portion is suppressed. Consequently, the liquid crystal display device of this embodiment enables to display an image thereby without luminance decrease.

Dotted patterns drawn in each cross-section of the lamp holders shown in FIGS. 1 through 3. These dotted patterns show that resin or other material having thermal conductivity like that of the resin of which the lamp holder 9 is formed has a plurality of pores therein. As these pores are formed in the lamp holder 9, heat conduction from the fluorescent lamp 8 to a housing (frame, casing, or else) is effectively reduced.

By the way, thermal conductivity of gas or solid state material is exemplified as follows. Each value of thermal conductivity is based on a unit being defined as W(Watt)/m(meter)·K(Kelvin: temperature).

---

Air: $2.41 \times 10^{-2}$ W·m$^{-1}$·K$^{-1}$ (at 0° C.)
(ditto): $3.41 \times 10^{-2}$ W·m$^{-1}$·K$^{-1}$ (at 100° C.)
Nitrogen (N$_2$): $2.40 \times 10^{-2}$ W·m$^{-1}$·K$^{-1}$ (at 0° C.)
(ditto): $3.09 \times 10^{-2}$ W·m$^{-1}$·K$^{-1}$ (at 100° C.)
Carbon dioxide (CO$_2$): $1.45 \times 10^{-2}$ W·m$^{-1}$·K$^{-1}$ (at 0° C.)
(ditto): $2.23 \times 10^{-2}$ W·m$^{-1}$·K$^{-1}$ (at 100° C.)
Argon (Ar): $1.63 \times 10^{-2}$ W·m$^{-1}$·K$^{-1}$ (at 0° C.)
(ditto): $2.12 \times 10^{-2}$ W·m$^{-1}$·K$^{-1}$ (at 100° C.)
Glass (Soda): 0.55~0.75 W·m$^{-1}$·K$^{-1}$ (at 0~20° C.)
Quartz Glass: 1.4 W·m$^{-1}$·K$^{-1}$ (at 0° C.)
(ditto): 1.9 W·m$^{-1}$·K (at 100° C.)
Rubber (Soft Rubber): 0.10~0.20 W·m$^{-1}$·K$^{-1}$ (at 0~20° C.)
Rubber (Sponge): 0.04 W·m$^{-1}$·K$^{-1}$ (at 25° C.)
Silicone Rubber: 1.0 W·m$^{-1}$·K$^{-1}$ (at 0~20° C.)
Acrylic Resin: 0.17~0.25 W·m$^{-1}$·K$^{-1}$ (at 0~20° C.)
Polyethylene: 0.25~0.34 W·m$^{-1}$·K$^{-1}$ (at 0~20° C.)
Polystyrene: 0.08~0.12 W·m$^{-1}$·K$^{-1}$ (at 0~20° C.)
Asbestos (Textile): 0.1 W·m$^{-1}$·K$^{-1}$ (at 0~20° C.)
Asbestos (Cotton): 0.06 W·m$^{-1}$·K$^{-1}$ (at 0~20° C.)

-continued

Aluminum: 236 W·m$^{-1}$·K$^{-1}$ (at 0° C.)
(ditto): 241 W·m$^{-1}$·K$^{-1}$ (at 100° C.)

---

As apparent from the thermal conductivity difference between the soft rubber and the sponge formed by introducing pores thereinto, or that between the textile-like asbestos and the cotton-like asbestos, although both members are formed of the same material, one of the members may have different thermal conductivity from that of another of the members in accordance with amounts of pores or gaseous layers existing in the respective members.

On the other hand, the thermal conductivity of the soda glass being utilized for the fluorescent lamp 8 is as 22 through 31 times greater as that of the air under the temperature of 0° C. Furthermore, the thermal conductivity of the aluminum being utilized for the lower frame 6 is as c.a. 10,000 times greater as that of the air. For example, temperature inside the fluorescent lamp rises up to 50° through 60° C., and temperature around the lower frame (environmental temperature for operating the liquid crystal display device) is around 20° C., during a practical use of the liquid crystal display device. Under the above exemplified environment for the practical use of the liquid crystal display device, the above-mentioned relationship of the thermal conductivity between the air and the soda glass and that between the air and the aluminum are almost unaffected.

The conventionally used lamp holder 9 as shown in FIG. 12 is formed of silicone rubber and contacts with an outer surface of a fluorescent lamp 8 therein, and at least one part of an outer surface thereof contacts with a lower frame 6, respectively. The construction of this sort is clearly understood with reference to FIG. 12 showing that the lower frame 6 covers the lamp holder 9. In contrast to such a conventionally employed construction, the lamp holder 9 being used for the liquid crystal display device according to the present invention is formed for example, of a material indicating thermal conductivity lower than either that of silicone rubber or 1 W·m$^{-1}$·K$^{-1}$ in any temperature selected from a range lying from −40° C. through 80° C.

Figure 13A:
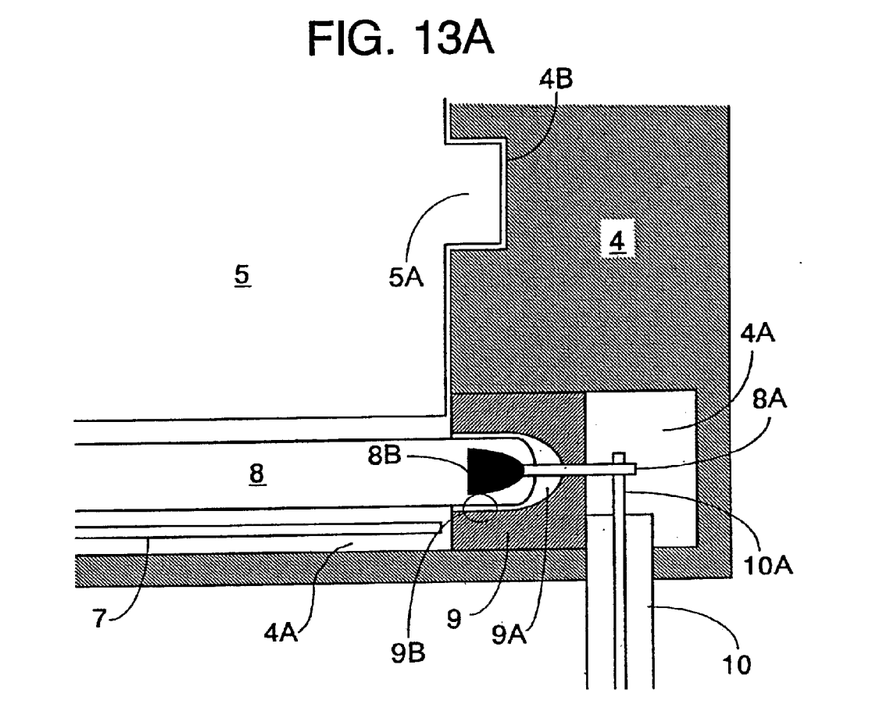
FIGS. 13A and 13B are partial cross-sectional views of lamp holding structures according to the present invention.

FIG. 13A shows an example of the intermediate mold frame 4 being equipped with the fluorescent lamp 8 by using the lamp holder 9 according to the present invention. FIG. 13A is drawn in the same view of FIG. 12, but differs from FIG. 12 in that FIG. 13 is a partial cross-sectional view which is taken along a plane including the electrode terminal 8A of the fluorescent lamp 8 and spreading along a surface of the lower frame 6 (or the liquid crystal display panel) and shows the intermediate mold frame 4, the fluorescent lamp 8, and the lamp holder 9 being cut along the plane respectively. Therefore, FIG. 13A does not show the lower frame 6, but shows an electrode 8B disposed in the fluorescent lamp 8 and a core wire 10A of the electric power supply lead 10 having coaxial structure. In FIG. 13A, a hollowed portion 4B is formed at a part of the side of the intermediate mold frame 4 which faces a part of a side of the light guide plate 5 and the protruded portion 5A is formed at the part of the side thereof similarly to those of FIG. 12 so that the light guide plate 5 is fixed at the intermediate mold frame 4 properly by fitting the protruded portion 5A into the hollowed portion 4B.

If the lamp holder 9 is formed of a material having sufficiently low thermal conductivity, the lamp holder 9 need not to include a plurality of pores therein. Therefore, a dotted pattern as a symbol of the pores are not drawn in a cross section of the lamp holder shown in FIG. 13A. The material replacement of this sort is applicable to a lamp holder 9 being explained in each of the embodiments 1 through 3, also.

The lamp holder 9 shown in FIG. 13A has a cavity 9A being formed therein into which one of ends of the fluorescent lamp 8 is inserted. The cavity 9A has an dead-ended structure which is substantially surrounded by the material utilized for the lamp holder 9 except for an opening for inserting the fluorescent lamp 8 thereinto. Strictly speaking, there is another opening at a portion of the lamp holder 9 through which the electrode terminal 8A of the fluorescent lamp 8 pierces. However, since an inner surface of the lamp holder 9 at the electrode terminal piercing portion contacts with a surface of the electrode terminal 8A more tightly than a contact thereof with the fluorescent lamp at the fluorescent lamp inserting portion, the opening at the electrode terminal piercing portion is negligible.

Heat dispersion from the end portion of the fluorescent lamp 8 causes not only through a contact surface thereof with the lamp holder 9, but also through the electrode terminal 8A thereof toward the electric power supply lead 10. For preventing the latter of the heat dispersions, the cavity 9A in the lamp holder 9 is formed to have a larger volume than that of an end portion of the fluorescent lamp being inserted thereinto. Even if a gap appears between the fluorescent lamp 8 and the lamp holder 9 at the fluorescent lamp inserting portion 9B, gas remaining in a space of the cavity 9A which is isolated from an outside of the lamp bolder by inserting the fluorescent lamp 8 into the cavity 9A (the space called a rest portion of the cavity 9A, hereinafter) can hardly leak out from the rest portion of the cavity, and is regarded to be almost confined in the rest portion, as long as a volume of the gap is smaller than that of the rest portion (the volume difference between the whole cavity 9A and the end portion of the fluorescent lamp being inserted into the cavity). Therefore, heat being conducted from the fluorescent lamp 8 to an outside thereof through the electrode terminal 8A thereof warms up the gas remaining in the rest portion of the cavity 9A so that the warmed gas prevents the temperature drop of the end portion of the fluorescent 8. Some of the heat from the fluorescent lamp 8 which does not contribute to warm up the gas in the rest portion of the cavity 9A and is conducted toward the electric power supply lead (rightward in FIG. 13A) by the electrode terminal 8 warms up the lamp holder 9 at the electrode piercing portion thereon. Consequently, the temperature of the lamp holder 9 is so increased that the temperature drop of the end portion of the fluorescent lamp 8 contacting therewith is suppressed effectively.

Figure 13B:
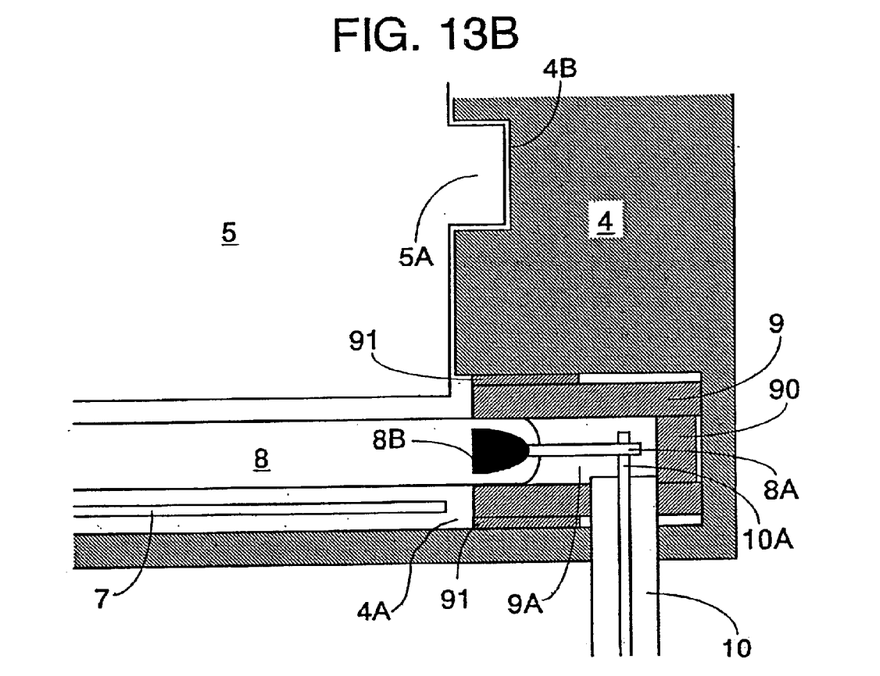

FIG. 13B is a partial cross-sectional view of another example of the lamp holding structure according to the present invention, and differs from FIG. 13A in that the lamp holder 9 has a tunnel-like structure and spacers 91 being disposed therearound. The lamp holder 9 of FIG. 13B has an opening for inserting the fluorescent lamp 8 into the cavity 9A thereof and another openings for inserting the electric power supply lead into the cavity 9A thereof, as that of FIG. 12 does. Furthermore, the lamp holder 9 of FIG. 13B has a third openings additionally to the aforementioned two openings. The third opening is provided for work to connect the electrode terminal 8A and the core wire 10A by soldering, spot-welding, or else in the cavity 9A. The third opening is filled up with a cap 90 after connecting the electrode terminal 8A to the core wire 10A so as to suppress a leakage of gas remaining in the rest portion of the cavity 9A to an outside of the lamp holder 9 in similar manner to the lamp holding structure of FIG. 13A. However, if the lamp holder 9 has sufficient elasticity and the intermediate mold frame has thermal conductivity lower than that of silicone rubber and a surface thereof being large enough to cover the third opening, the third opening may be blocked with the intermediate mold frame by pressing the third opening side of the lamp holder 9 upon the surface thereof.

In the example of FIG. 13B, at least one spacer is provided between an outer surface of the lamp holder 9 and any surface of the intermediate mold frame 4, the lower frame (not shown), or the like which faces the outer surface of the lamp holder 9. The spacer may be for an example, shaped into a sleeve-like form rolling up an circumference of the lamp holder 9 (if having a tuber form), or for another example, separated to a plurality of pieces.

By disposing the spacer 91 between the lamp holder 9 and the intermediate mold frame 4 as FIG. 13B, a first interface between the fluorescent lamp 8 and the lamp holder 9, a second interface between the lamp holder 9 and the spacer 91, and a third interface between the spacer 91 and the intermediate mold frame 4 appear on a path of heat conduction from the fluorescent lamp 8 to the intermediate mold frame 4. According to manufacturing precision for assembling the lamp holding structure, gas penetrates into each of the interfaces, so that each of the interface functions like a porous member (a member having a plurality of pores therein). Therefore, even by adding the spacer 91 to the heat conduction path as FIG. 13B shows, the thermal conductivity of the whole of the heat conduction path is decreased enough to suppress the temperature drop at an end portion of the fluorescent lamp 8. Such an advantage of the spacer 91 is also available for disposing the spacer between the lamp holder 9 and the member being formed of metal like the lower frame. Furthermore, by using the spacer 91, the lamp holder 9 is able to be formed not only of a material disclosed in the preceding embodiments 1 through 3, but also of silicone rubber for example. The spacer may be formed of any materials, and preferably is formed a material having thermal conductivity equal to or lower than that of the lamp holder 9.

One of the lamp holding structures of FIG. 13B is embodied by combining a lamp holder 9 utilizing a rubber bush formed of silicone rubber with a spacer 91 formed of acrylic resin or ABS (acrylonitrile butadiene styrene) resin. For this example, a part of a metal member like a lower frame which faces the rubber bush is recommended to be cut away as mentioned in following embodiments 4 and 5. Especially, by removing a part of the metal member having a possibility to be contacted with the spacer 91, the heat dispersion from the fluorescent lamp 8 to the metal member is prevent so that the temperature of the electrode portion of the fluorescent lamp is kept at proper value exactly. On the other hand, the lamp holder 9 is recommended to be spaced from any members other than the spacer(s) 91.

Embodiment 4

Figure 4:
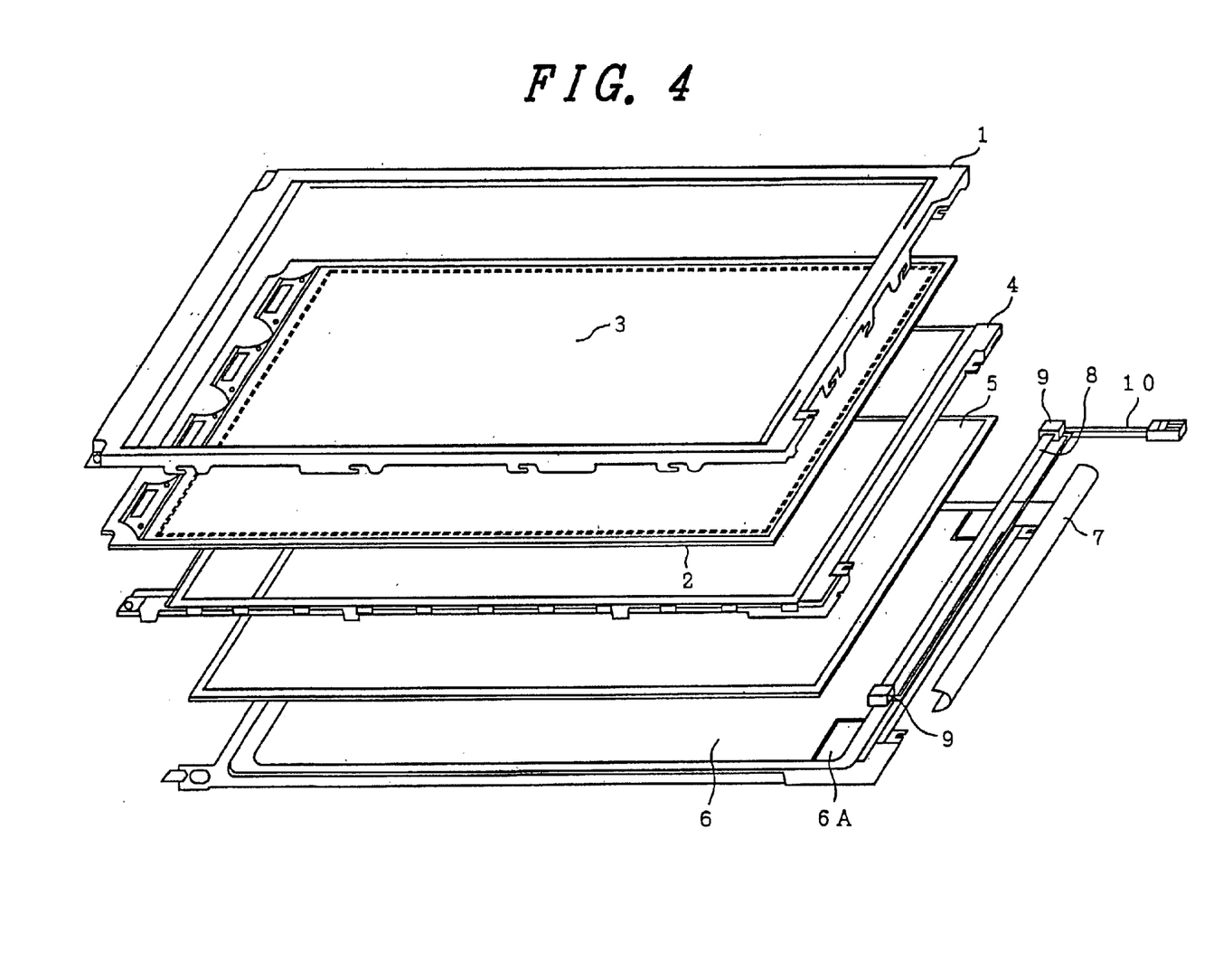
FIG. 4 is an disassembled squint view of a liquid crystal display device for explaining the liquid crystal display devices according to fourth and fifth embodiments of the present invention.

FIG. 4 is an disassembled squint view of a liquid crystal display device for explaining the liquid crystal display devices according to a fourth embodiment and a fifth embodiment to be mentioned later of the present invention, and shows a similar structure to that in FIG. 11 except for a lower frame thereof.

Figure 5:
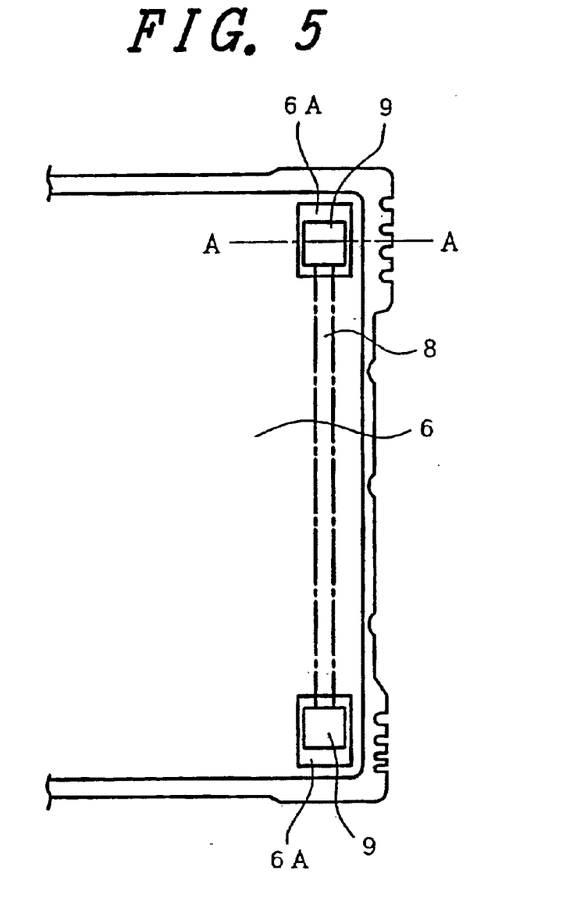
FIG. 5 is a plan view of a main portion of a liquid crystal display device (around a fluorescent lamp) seen from a lower frame side thereof for explaining the lower frame of the liquid crystal display device shown in FIG. 4 according to a fourth embodiment of the present invention.
Figure 6:
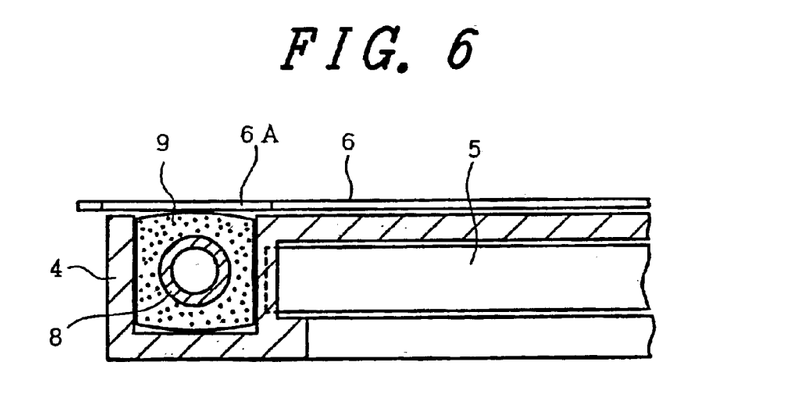
FIG. 6 is an partial cross-sectional view being taken along a line A—A of FIG. 5.

FIG. 5 is a plan view of a main portion of a liquid crystal display device (around a fluorescent lamp installed therein) seen from a lower frame side thereof for explaining the lower frame of the liquid crystal display device shown in FIG. 4 according to a fourth embodiment of the present invention, and FIG. 6 is an partial cross-sectional view being taken along a line A—A of FIG. 5, respectively.

In the fourth embodiment of the present invention, a lamp holder 9 may be formed of a material being utilized for that of the conventional type, and heat dispersion from the lamp holder 9 to the lower frame 6 constituting the liquid crystal display device is prevented by an opening 6A of the lower frame 6 which is facing the electrode portion of the fluorescent lamp. Consequently, a temperature drop of the electrode portion of the fluorescent lamp 8 is so suppressed that illumination of high brightness is able to be obtained by the fluorescent lamp. The lower frame 6 in this embodiment is shaped into a skeleton-like form, and rectangular openings (or, holes, windows) 6A formed by punching respective portions of the lower frame 6 corresponding to the respective electrode portion of the fluorescent lamp 8 as FIGS. 5 and 6 shows. These openings are shaped not only into rectangular forms but also into any forms properly.

Embodiment 5

In the fifth embodiment of the present invention equipping the electrode portions of the fluorescent lamp 8 with such lamp holders as explained with reference to FIGS. 1 through 3 previously, heat dispersion from the lamp holder 9 to the lower frame 6 is suppressed furthermore, because the lamp holders 9 have heat retaining effect. Therefore, a temperature drop at each of the electrode portions of the fluorescent lamp 8 is so suppressed that illumination of higher brightness is able to be obtained by the fluorescent lamp.

As FIG. 6 shows, the fluorescent lamp 8 is fixed to the intermediate mold frame 4 by forcing the fluorescent lamp into the light source retaining portion 4A thereof using elastic deformation of the lamp holders 9 attached thereto. The fluorescent lamp 8 is also fixed at a position facing a side of the light guide plate 5 which is incorporated to the intermediate mold frame 4.

According to this embodiment, heat dispersion to the lower frame 6 is so suppressed that a temperature drop of the electrode portion of the fluorescent lamp 8 is suppressed by retaining the temperature thereof and consequently an image of high display quality is obtained by preventing luminance decrease.

Embodiment 6

Figure 7:
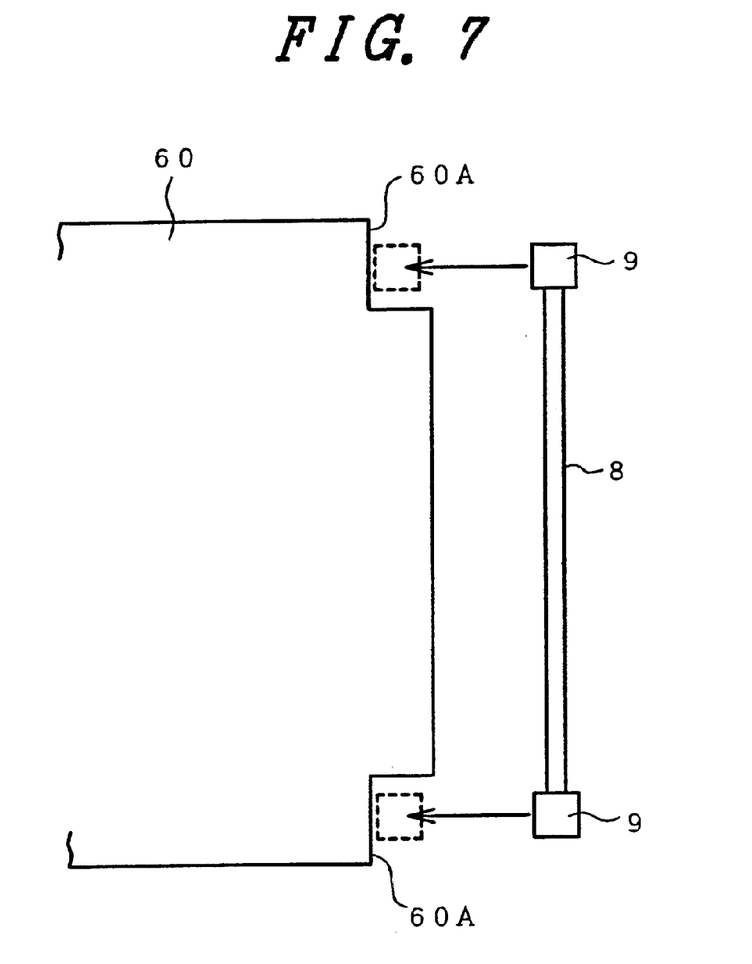
FIG. 7 is a plan view of a main portion of a liquid crystal display device (around a fluorescent lamp) seen from a lower frame side thereof for explaining the lower frame of the liquid crystal display device according to a sixth embodiment of the present invention.

FIG. 7 is a plan view of a main portion of a liquid crystal display device (around a fluorescent lamp) seen from a lower frame side thereof for explaining the lower frame of the liquid crystal display device according to a sixth embodiment of the present invention. In this embodiment, the lower frame 60 is formed of a simple plate which does not have such a skeleton-shaped structure as mentioned in the aforementioned embodiments.

Therefore, a notch 60A is formed at portions of the lower frame 6 (a pair of corners thereof, in this embodiment) corresponding to the electrode portions of the fluorescent lamp 8 so as to prevent heat dispersion from the lamp holder 9 to the lower frame 6, in this embodiment.

Moreover, regardless of such shapes and materials of the lamp holders 9 as explained by referring FIGS. 1 through 3, any kinds of the lamp holders like that used conventionally may be utilized as the lamp holders 9 being attached to the fluorescent lamp 8 for suppressing the luminance decrease, in this embodiment.

Various embodiments of the present invention being mentioned above are also applied to the liquid crystal display device employing a fluorescent lamp having so-called double-piped structure being disclosed for example by the Japanese Patent Application Laid-Open No. Hei 08-334760/ JP-A-334760/1996. The fluorescent lamp 8 of this sort has a cross sectional structure shown as FIG. 14A.

Figure 14A:
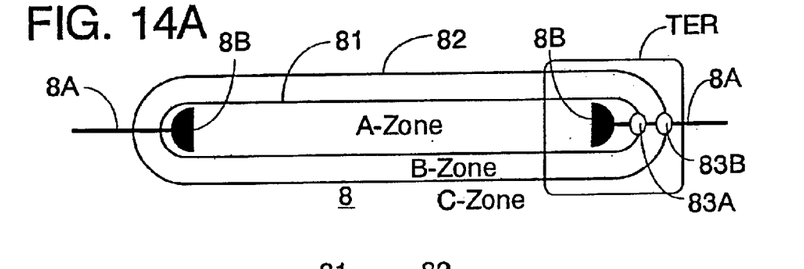
FIG. 14A shows an example thereof as a whole.

In the fluorescent lamp of the double-piped type, a glass chamber 81 constituting a main body of the fluorescent lamp is disposed within another glass chamber 82. An A-zone within the glass chamber 81 is provided for generating illuminating light, and a B-zone being surrounded by an outer surface of the glass chamber 81 and an inner surface of the glass chamber 82 is provided for thermal insulation between the A-zone and a C-zone. The C-zone means an environment around the fluorescent lamp 8. Temperature of the A-zone should be kept at 50~60° C. for generating illuminating light therein. However, an environmental temperature of the fluorescent lamp 8 remains lower than that of the A-zone. In a conventionally used fluorescent lamp mentioned previously, the A-zone is separated from the C-zone only by one glass tube so that the temperature of the A-zone can be hardly kept in a preferable range for emitting light. The fluorescent lamp of the double piped type provides the B-region containing air or the like between the A-zone and the C-zone and reduces thermal conductivity between the A-zone and the C-zone by keeping temperature of the B-zone between those of the A-zone and the C-zone. Thus, the whole of the A-zone is kept at the preferable temperature for light emission.

Figure 14B:
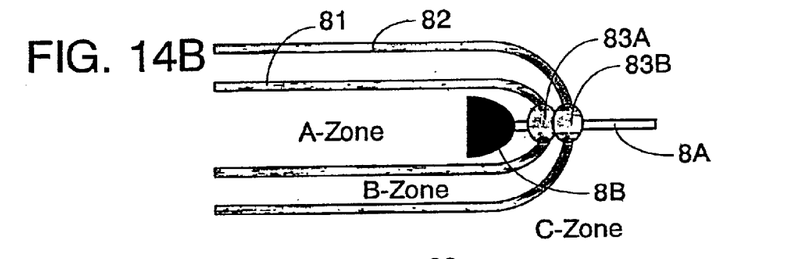
FIGS. 14B and 14C show the other example thereof as enlarged images around electrode portions of the fluorescent lamps.
Figure 14C:
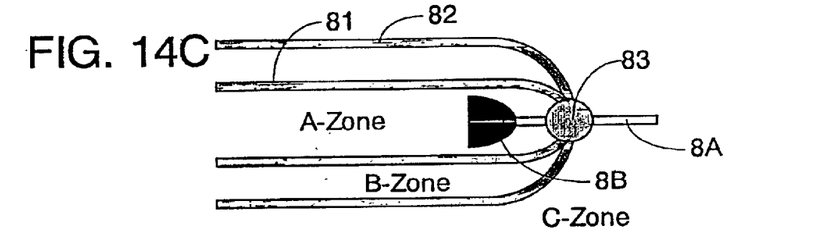

However, even in the double piped fluorescent lamp, a possibility of heat dispersion from a electrode portion TER of the fluorescent lamp 8 still remain. The B-zone along the electrode terminal 8A is hardly enlarged so that heat is easily leaked out to the C-zone by the electrode terminal 8A. On the other hand, the double piped structure is assembled by forming glass beads 83A and 83B formed around the electrode terminal 8A, then by welding an inner glass tube to the glass bead 83A for forming the glass chamber 81, and finally by welding an outer glass tube to the glass bead 83B for forming glass chamber 82. However, according to the manufacturing precision, the glass beads 83A and 83B tend to be contacted with one another as FIG. 14B shows, or both of the glass beads 83A and 83B tend to be united to be a glass bead 83 as FIG. 14C shows. In these structure, heat can be leaked through an interface between the glass beads from the A-zone to the C-zone also, and consequently the temperature of the A-zone around the electrode portion TER can be hardly kept at the preferable value for generating the illuminating light.

Figure 15:
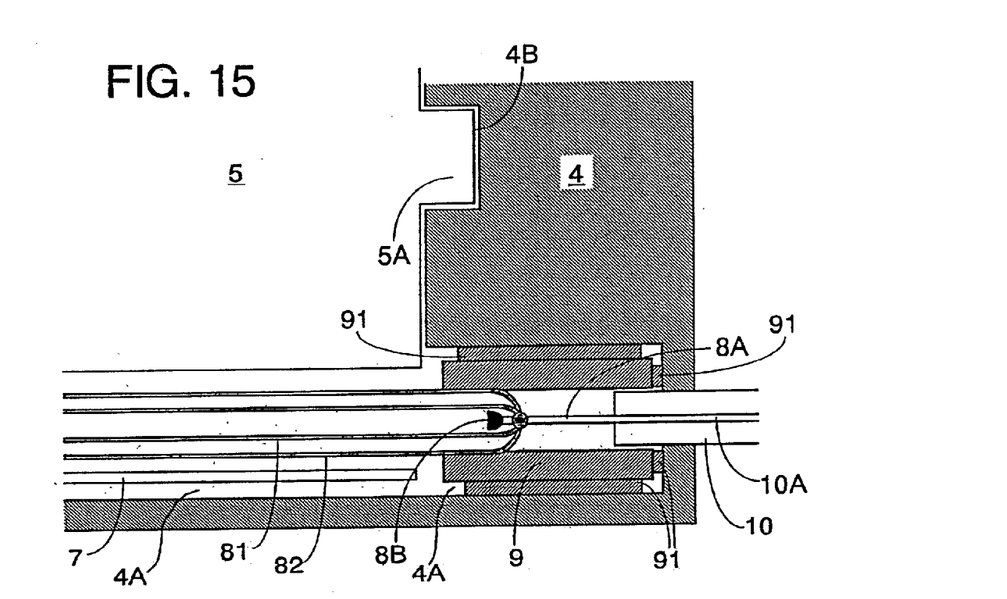
FIG. 15 is a partial cross-sectional view of a lamp holding structure according to the present invention being applied to a fluorescent lamp having the double-piped structure.

For solving the aforementioned problems being missed in the double piped fluorescent lamp 8 previously, the present invention is applied to the lamp holding structure for the double piped fluorescent lamp 8 in similar manners to those for the conventionally used fluorescent lamp 8 as mentioned above. FIG. 15 is a partial cross-sectional view of one of the lamp holding structure for the double piped fluorescent lamp 8 to which the present invention is applied. The lamp holding structure of FIG. 15 employs a similar to that of FIG. 13B, but differs from FIG. 13B in that the electrode terminal 8A is extended straightforward to the core wire 10A of the electric power supply lead 10, the opening for inserting the electric power supply line 10 is formed at opposite side to the opening for inserting, the fluorescent lamp 8, and a washer-like spacer 91 is added at the side for spacing the lamp holder 9 from the intermediate mold frame 4. The sleeve-like lamp holder 9 contact with an outer surface of the electric power supply lead 10 so as to be movable along the core wire 10A thereof. Therefore, a process for connecting the electrode terminal 8A to the core wire 10A becomes easier. The washer-like spacer being added to this structure helps the lamp holder 9 confine gas in the cavity thereof.

Of course, the lamp holding structures according to the present invention other than that of FIG. 15 may be applied to the double-piped fluorescent lamp, and the lamp holding structure of FIG. 15 may be also applied to the fluorescent lamp other than that having the double-piped structure.

Figure 8:
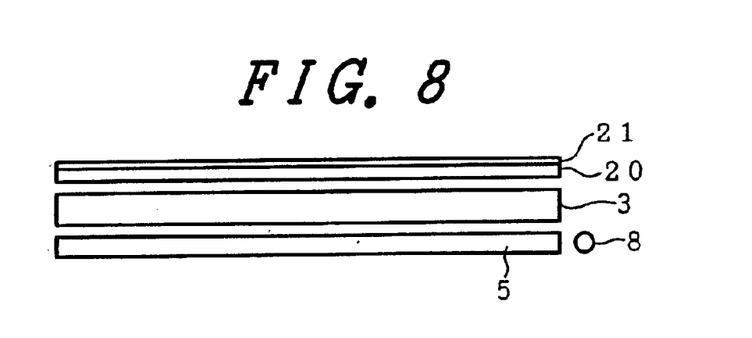
FIG. 8 is an outlined diagram of one of liquid crystal display devices for portable data terminals for explaining the one of liquid crystal display devices to which the present invention is applied.

FIG. 8 is an outlined diagram of one of liquid crystal display devices for portable data terminals for explaining the one of liquid crystal display devices to which the present invention is applied, and shows a transparent type liquid crystal display panel 3, a light guide plate 5, a fluorescent lamp 8, a touch panel 20, and a protective film 21, respectively.

This liquid crystal display devices for portable data terminals is equipped with the fluorescent lamp and the lamp holders mentioned in any one of the aforementioned embodiments. Furthermore, a touch panel onto which data or commands are inputted by a pen-like device is provided on or over the liquid crystal display panel 3. Moreover, the protective film 21 having an abrasion-proof property and preventing extraneous light from being reflected thereby is stacked on an upper surface of the touch panel 20.

Figure 9:
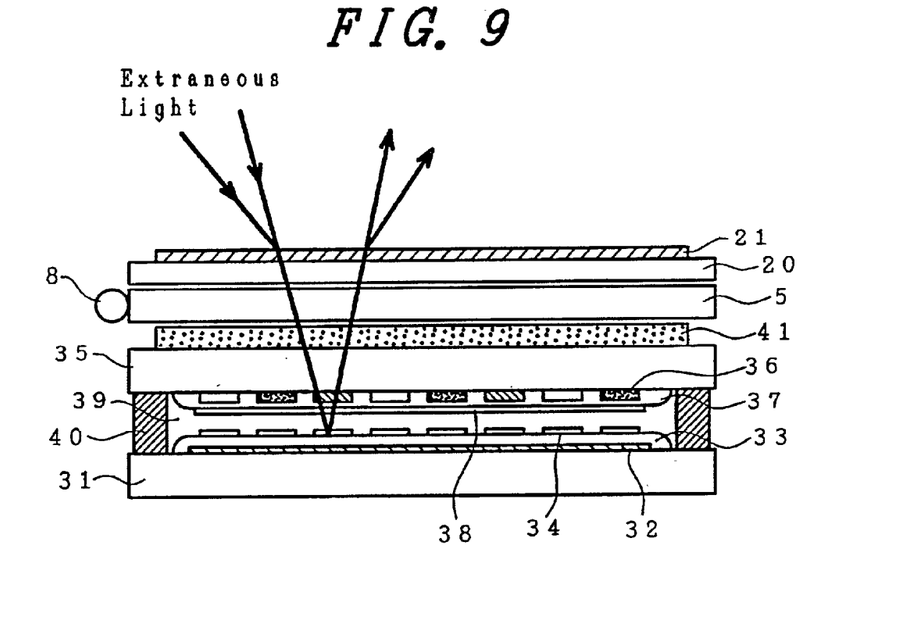
FIG. 9 is a cross-sectional view of another of liquid crystal display devices for portable data terminals for explaining the another of liquid crystal display devices to which the present invention is applied.

FIG. 9 is a cross-sectional view of another of liquid crystal display devices for portable data terminals for explaining the another of liquid crystal display devices to which the present invention is applied, and so-called reflective type liquid crystal display panel is utilize therefor. In FIG. 9 a lower glass substrate 31 as a lower substrate, an aluminum film 32 as a reflective layer, a protective film 33 formed of anti-oxidation film of $SiO_2$ or the like, lower transparent electrodes 34 as lower-side electrodes, an upper glass substrate 35 as an upper substrate, color filters 36 each of which has one of three kinds of color (R: Red, G: Green, B: Blue), protective film 37 formed of a transparent organic material for protecting a liquid crystal layer from pollutants exuding from the color filters and for leveling a surface on which upper-side electrodes are formed, one of transparent electrodes 38 as upper-side electrodes, a liquid crystal layer 39 containing liquid crystal compounds, and a scaling material 40 of epoxy resin or the like for gluing the upper side substrate and the lower side substrate to form a liquid crystal panel so as to seal the liquid crystal layer therebetween are shown.

The liquid crystal display panel in this embodiment is a so-called STN-type (Super Twist Nematic-type) liquid crystal display panel, and optical films 41 including an optical retardation plate and a polarizer are stacked on a surface thereof at the upper glass substrate 35 side (at an upper side thereof).

As the need arises, lattice-like light shielding film (black matrix) is provided among color filters 36 so as to separate respective colors R, G, and B thereof from each other, and then the protective film 37 is formed over the color filters and the black matrix.

The aluminum film 32 as a reflective layer having specular reflection property (mirror reflection property) is formed by a deposition method using aluminum in this embodiment. Multi-layered films for improving a reflectance of the aluminum film 32 may be formed on a surface thereof, and the protective film 33 for preventing the aluminum thereof from being corroded and for leveling upper surface of the protective film itself is formed on or over a surface thereof. The reflective layer of this sort may be formed of metal or nonmetallic material other than aluminum as long as a layer of the metal or the nonmetallic material has a sufficient specular reflection property for the reflective film. The protective film is usually formed of a transparent organic material, and a lower-side transparent electrode 4 for driving the liquid crystal display panel is formed an upper surface thereof.

A degree of polarization and a polarization as of the polarizer constituting the optical films 41 disposed on an upper surface of the upper-side glass substrate, and a value of Δnd of the optical retardation plate (Δnd: a product being calculated from birefringence: Δn multiplied by its thickness: d) constituting the optical films 41 also are designed to be optimum values respectively which are determined in accordance with a twist angle, a tilt angle, and a value of Δnd of the liquid crystal compound (Δnd: a product being calculated from birefringence of the liquid crystal compound: Δn multiplied by thickness of the liquid crystal layer containing the liquid crystal compound: d), by a known method.

A light guide plate 5 having a function for emitting light toward the liquid crystal display panel effectively is disposed above an upper side thereof where the optical films 41 are disposed, so that the light guide plate functions as an auxiliary light source for enabling use thereof in such a dark environment as a room with little extraneous light, the night, or the like. The, light guide plate 5 is shaped by processing a surface of a board formed of transparent acrylic resin or the like. The fluorescent lamp 8 like a cold cathode fluorescent lamp or else is disposed along one of edges of the light guide plate 5, and supplies illuminating light therefrom into the light guide plate 5. The luminaire of this sort is called a front light, generally.

According to the liquid crystal display device, an image of high display quality is available with low electric power consumption.

Figure 10:
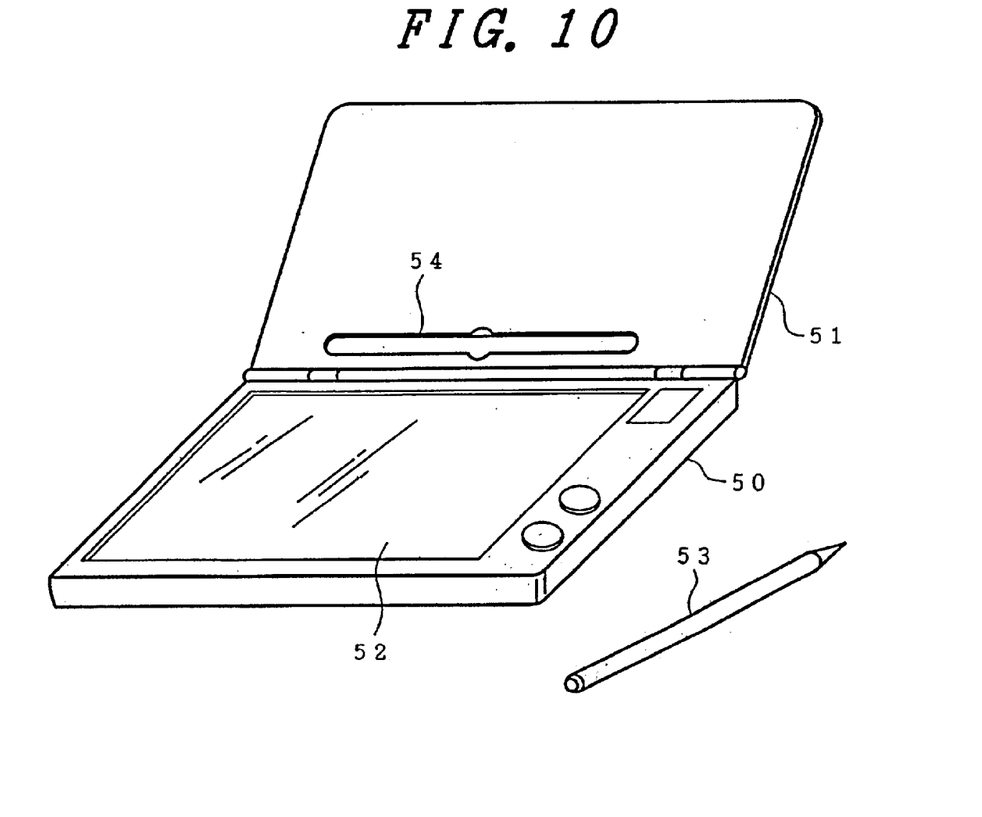
FIG. 10 is an explanatory diagram exemplifying an exterior of a portable data terminal as an example of electronic devices to which a liquid crystal display device according to the present invention is installed.

FIG. 10 is an explanatory diagram exemplifying an exterior of a portable data terminal as an example of electronic devices to which a liquid crystal display device according to the present invention is installed. The portable data terminal comprises a main body 50, and a cover 51 being mounted at one of ends of the main body 50 with a hinge so as to allow the cover to cover and to reveal a display screen of the aforementioned liquid crystal display device 52 according to the present invention freely, which is installed in the main body 50.

Information is inputted to the portable data terminal by tracing a data input section on the display screen of the liquid crystal display device 52 with a pen 53 (a pen-like tool) which is housed in a housing portion 54 formed at the cover 51.

Moreover, a shape, a structure, and a function of the portable data terminal of this sort are not limited to those shown herein, but are considered to be diversified.

On the other hand, the present invention should not be limited to an application for the aforementioned liquid crystal display device having a touch panel, but may be applied to the other well-known liquid crystal display devices as well.

As explained above, the liquid crystal display device according to the present invention suppresses the temperature drop of the electrode portion at the end of the fluorescent lamp (especially for the cold cathode fluorescent lamp) even if current being supplied therefor is low. Therefore, temperature difference between the electrode portion and middle portion thereof is so reduced that the luminance decrease phenomenon of the fluorescent lamp by accumulation of mercuric droplets at the end thereof is prevented. Consequently, the liquid crystal display device with high brightness and high reliability is available.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
   a liquid crystal display panel;
   a luminaire disposed so as to irradiate said liquid crystal display panel with light, and having at least one fluorescent lamp;
   a housing containing at least said luminaire;
   at least one lamp holder holding said at least one fluorescent lamp at an electrode portion; and
   at least one spacer provided between an outer surface of said lamp holder and a surface of another member which is different from said lamp holder.

2. A liquid crystal display device according to claim 1, wherein the thermal conductivity of said spacer is equal to or lower than the thermal conductivity of said lamp holder.

3. A liquid crystal display device according to claim 1, wherein the thermal conductivity of said at least one lamp holder is lower than the thermal conductivity of silicone rubber.

4. A liquid crystal display device according to claim 1, wherein said lamp holder has a plurality of pores therein.

5. A liquid crystal display device according to claim 1, wherein said housing has at least one opening or at least one notch corresponding to at least one electrode portion of said at least one fluorescent lamp.

6. A liquid crystal display device according to claim 1 wherein said spacer has a plurality pores therein.

7. A liquid crystal display device according to claim 1 wherein said spacer is provided between said at least one lamp holder and said housing.

8. A liquid crystal display device according to claim 1 wherein said at least one fluorescent lamp is a cold cathode fluorescent lamp having double-piped structure.

9. A liquid crystal display device according to claim 1, wherein said at least one lamp holder is a rubber bushing.

10. A liquid crystal display device comprising:
    a liquid crystal display panel;
    a luminaire disposed so as to irradiate said liquid crystal display panel with light, having at least one fluorescent lamp;
    a housing containing at least said luminaire; and
    at least one lamp holder holding said at least one fluorescent lamp at an electrode portion,
    wherein said at least one fluorescent lamp is a cold cathode fluorescent lamp having double-piped structure, and
    further comprising at least one spacer provided between said lamp holder and said housing.

11. A liquid crystal display device according to claim 10, wherein the thermal conductivity of said spacer is equal to or lower than the thermal conductivity of said lamp holder.

12. A liquid crystal display device according to claim 10, wherein said at least one lamp holder is a rubber bushing.

* * * * *

UNITED STATES PATENT AND TRADEMARK OFFICE
CERTIFICATE OF CORRECTION

PATENT NO. : 6,839,100 B1
DATED : January 4, 2005
INVENTOR(S) : Saito et al.

It is certified that error appears in the above-identified patent and that said Letters Patent is hereby corrected as shown below:

<u>Column 7,</u>
Line 62, please delete "Silicone Rubber: $1.0 \text{ W} \cdot \text{m}^{-1} \cdot \text{K}^{-1}$ (at 0~20C)" and replace with -- Silicone Rubber: about $0.2 \text{ W} \cdot \text{m}^{-1} \cdot \text{K}^{-1}$ (at 0~20ºC) --

Signed and Sealed this

Fifth Day of April, 2005

JON W. DUDAS
*Director of the United States Patent and Trademark Office*